May 12, 1931.  A. J. KRANTZ  1,805,287
FRUIT PICKING PAIL
Filed May 21, 1929
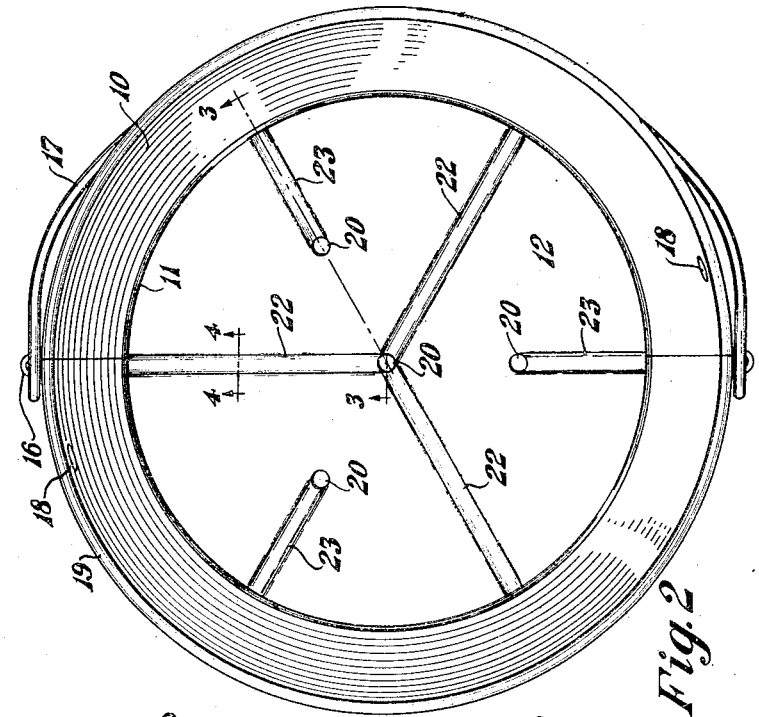
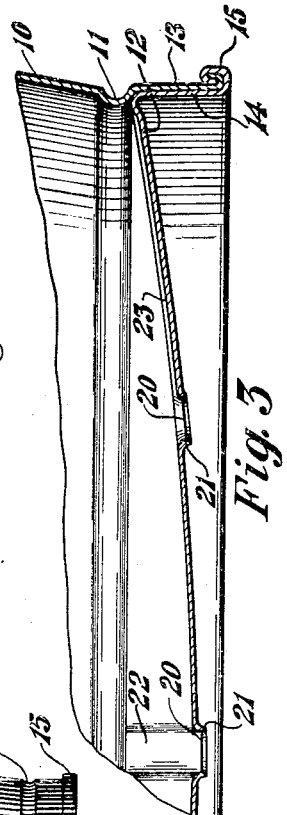
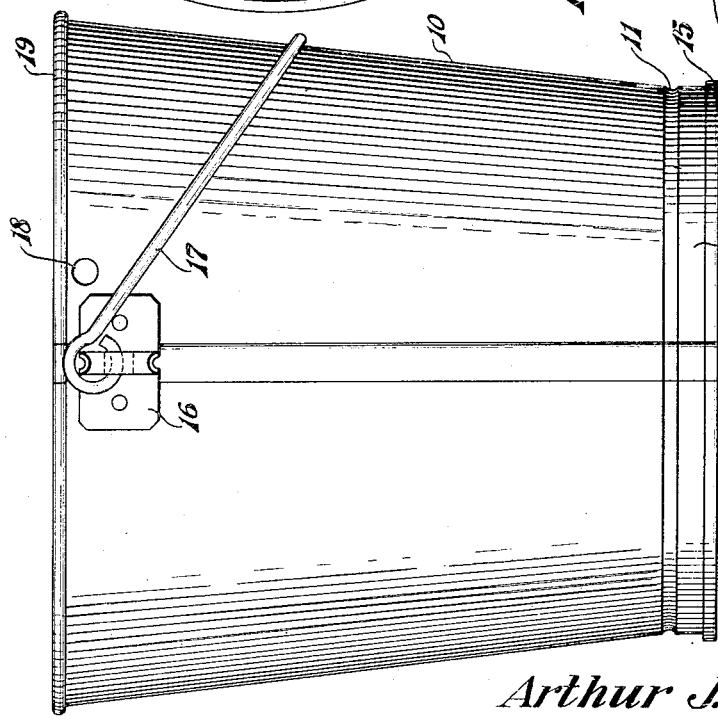
Inventor
Arthur J. Krantz
By Harry Frease, Attorney Patented May 12, 1931

1,805,287

UNITED STATES PATENT OFFICE

ARTHUR J. KRANTZ, OF DOVER, OHIO, ASSIGNOR TO THE REEVES MANUFACTURING COMPANY, OF DOVER, OHIO, A CORPORATION OF OHIO

FRUIT PICKING PAIL

Application filed May 21, 1929. Serial No. 364,786.

The invention relates to pails adapted for picking fruit. The use of metal pails for picking apples, peaches and other fruit in large orchards has been found advantageous as the rugged construction of the pails makes them capable of withstanding the hard usage to which they are subjected.

Furthermore the pails may be supported upon a shoulder strap worn by the picker, thus leaving both hands free to work.

However, it has been found that frequently the fruit is damp from rain, dew or the like and moisture collects in the lower portion of the pail, causing injury to the fruit. In order to overcome this objection, attempts have been made to provide for drainage of such moisture by forming a convex bottom in the pail and providing apertures near the peripheral portion thereof. However, it will be seen that after a pail has been used for a short time the weight of the fruit therein will bend the convex bottom downward until the same is concaved, thus draining the water to the imperforate central portion of the pail bottom.

The object of the present improvement is to provide a pail having a concave bottom provided with drain apertures at its central portion. In order to prevent marring of the fruit by contact with these apertures, the same are countersunk, thus presenting a smooth surface to any fruit which contacts with one of the apertures.

A further object is to provide shallow grooves or depressions in the pail bottom extending radially from the periphery to the drain apertures, providing for the quick drainage of all moisture as well as strengthening the bottom of the pail.

The above and other objects may be attained by constructing the pail in the manner illustrated in the accompanying drawings, in which Figure 1 is a side elevation of the improved fruit picking pail;

Fig. 2, a top plan view thereof;

Fig. 3, an enlarged section through the bottom of the pail taken substantially on the line 3—3, Fig. 2; and Fig. 4, a fragmentary section through one of the grooved portions of the pail bottom, taken on the line 4—4, Fig. 2.

Similar numerals refer to similar parts throughout the drawings.

The side wall of the pail may be slightly tapered, in usual manner, as illustrated generally at 10 and provided near the lower end with the internal annular rib 11 against which the concaved bottom 12 is seated.

The side wall and bottom are provided with the respective depending annular flanges 13 and 14 folded together in the double folded seam 15 at the lower edge of the bucket.

The bail ears 16 are preferably located at diametrically opposite points near the upper edge of the bucket and may be of any usual and well known construction for the attachment of the ordinary handle bail 17, by means of which the bucket may be carried or transported.

An aperture 18 may be formed in the side wall of the bucket under the rolled rim 19 adjacent to each ear 16 for the purpose of attaching the snaps of a shoulder strap by means of which the pail may be suspended from the shoulder of the picker, leaving both of his hands free to pick fruit.

The bottom 12 is considerably concaved, as illustrated in Fig. 3, and for the purpose of draining any moisture accumulating upon the bottom, the apertures 20 are provided in the central portion thereof.

In order to prevent these apertures from marring any fruit coming in contact therewith, each of the apertures is countersunk, as shown at 21, thus presenting a smooth surface to the fruit and preventing any sharp cutting edge from coming in contact therewith.

In order to assist in the draining, as well as to reinforce and strengthen the bottom of the pail, radial shallow grooves or corrugations 22 and 23 may be formed in the bottom, extending from the peripheral portion thereof to the apertures 20.

The grooves 22 may be located between the outer apertures and extend entirely across the radius of the pail bottom from the periphery to the central aperture 20, while the grooves 23 may extend only from the periphery of the bottom to the outer apertures 20.

With this construction, in the event the pail is tilted, the moisture will drain to the nearest groove and then to the aperture 20 communicating therewith.

From the above, it will be obvious that the pail will not retain any moisture as the same will all drain toward the center of the concaved bottom of the pail and out through the apertures 20, thus preventing detriment to the fruit by moisture accumulating in the bottom of the pail.

It will also be seen that the pail, because of the apertures in the bottom, cannot be used for any poisonous solutions such as are adapted for spraying fruit trees and furthermore, the pails will not be taken away by the pickers for use as water pails and the like.

I claim:

1. A fruit picking pail having an enlarged open top end and a drain aperture in its bottom, said aperture being countersunk to prevent marring of fruit contacting therewith.

2. A fruit picking pail having a concavely curved bottom provided with a drain aperture at its central portion, said aperture being countersunk to prevent marring of fruit contacting therewith.

3. A fruit picking pail having a concavely curved bottom provided with a drain aperture at its central portion and a groove in the bottom extending from the peripheral portion thereof to said aperture.

4. A fruit picking pail having a concavely curved bottom provided with a plurality of drain apertures at its central portion and radial grooves extending from the peripheral portion of the bottom to said apertures.

5. A fruit picking pail including walls forming an opening at its top end having a cross sectional area not less than the cross sectional area of its bottom end and having a concavely curved bottom, a plurality of countersunk drain apertures formed in the bottom, and radial grooves provided in the bottom extending from its peripheral portion to said apertures.

In testimony that I claim the above, I have hereunto subscribed my name.

ARTHUR J. KRANTZ.